United States Patent
Park (10) Patent No.: US 11,550,929 B2
(45) Date of Patent: Jan. 10, 2023

(54) MEMORY SYSTEM

(71) Applicant: SK hynix Inc., Gyeonggi-do (KR)

(72) Inventor: Jeen Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 688 days.

(21) Appl. No.: 16/528,125

(22) Filed: Jul. 31, 2019

(65) Prior Publication Data

US 2020/0104512 A1 Apr. 2, 2020

(30) Foreign Application Priority Data

Oct. 1, 2018 (KR) ........................ 10-2018-0116982

(51) Int. Cl.
*G06F 21/60* (2013.01)
*G06F 3/06* (2006.01)

(52) U.S. Cl.
CPC .......... *G06F 21/602* (2013.01); *G06F 3/0604* (2013.01); *G06F 3/0659* (2013.01); *G06F 3/0679* (2013.01)

(58) Field of Classification Search
CPC .... G06F 21/602; G06F 3/0604; G06F 3/0659; G06F 3/0679
See application file for complete search history.

(56) References Cited

U.S. PATENT DOCUMENTS

| | | | | |
|---|---|---|---|---|
| 7,685,206 B1* | 3/2010 | Mathew | ................ | H04L 63/105 707/785 |
| 2002/0103943 A1* | 8/2002 | Lo | ....................... | H04L 67/1097 710/2 |
| 2004/0264698 A1* | 12/2004 | Oda | ..................... | H04N 1/4486 380/217 |
| 2005/0289655 A1* | 12/2005 | Tidwell | ............... | G06F 21/6218 713/193 |
| 2007/0067638 A1* | 3/2007 | Haibl | ..................... | H04L 63/08 713/182 |
| 2008/0189360 A1* | 8/2008 | Kiley | .................... | H04L 69/329 709/203 |
| 2012/0253892 A1* | 10/2012 | Davidson | ........... | G06Q 10/0631 705/7.42 |
| 2014/0047522 A1* | 2/2014 | Chin | ....................... | H04L 63/08 726/9 |
| 2016/0062917 A1* | 3/2016 | Mylly | ..................... | G06F 21/44 711/163 |
| 2016/0371019 A1* | 12/2016 | Kang | .................... | G06F 3/0679 |

FOREIGN PATENT DOCUMENTS

KR 1020090033191 4/2009

\* cited by examiner

*Primary Examiner* — Vance M Little
(74) *Attorney, Agent, or Firm* — IP & T Group LLP (57) ABSTRACT

A memory system includes a nonvolatile memory device; and a controller configured to control the nonvolatile memory device, wherein the controller is configured to: receive a system information request including a command and an argument from a host device; determine suitability of the system information request based on a fixed key included in the argument in response to the command; encrypt system information based the argument when the system information request is suitable; and transmit the encrypted system information to the host device.

19 Claims, 6 Drawing Sheets

MEMORY SYSTEM

CROSS-REFERENCES TO RELATED APPLICATION

The present application claims priority under 35 U.S.C. § 119(a) to Korean application number 10-2018-0116982, filed on Oct. 1, 2018, which is incorporated herein by reference in its entirety.

BACKGROUND

1. Technical Field

Various embodiments generally relate to a memory system, and more particularly, to a memory system including a nonvolatile memory device.

2. Related Art

A memory system may store data provided from a host device, in response to a write request of the host device. Furthermore, the memory system may provide the stored data to the host device, in response to a read request of the host device. The host device, which is an electronic device capable of processing data, may include a computer, a digital camera, a mobile phone, or the like. The memory system may be installed and operated in the host device, or manufactured in the separable form and operated by being coupled to the host device.

SUMMARY

Various embodiments may provide a memory system capable of preventing an indiscriminate leak of sensitive system information.

In an embodiment, a memory system may include: a nonvolatile memory device; and a controller configured to control the nonvolatile memory device, wherein the controller is configured to: receive a system information request including a command and an argument from a host device; determine suitability of the system information request based on a fixed key included in the argument in response to the command; encrypt system information based on the argument when the system information request is suitable; and transmit the encrypted system information to the host device.

In an embodiment, a memory system may include: a nonvolatile memory device; and a controller configured to control the nonvolatile memory device, wherein the controller is configured to: receive a system information request including a command and an argument from a host device; encrypt system information based on a fixed key and a variable key that are included in the argument, in response to the command; and transmit the encrypted system information to the host device.

In an embodiment, a memory system may include: a nonvolatile memory device; and a controller configured to: receive a system information request including a command and an argument from a host device; encrypt system information by comparing the argument with security information stored in the memory system in response to the command; and transmit the encrypted system information to the host device.

In an embodiment, an operating method for a slave working in response to a request from a master, the method comprising: authenticating the master based on an authentication key included in the request; encrypting information requested by the master based on the authentication key and an encryption key selected from the request according to a predetermined selection scheme; and providing the encrypted information to the master to receive the requested information by decrypting the provided information, wherein each of the authentication key and the selection scheme includes information stored in both of the master and the slave.

DETAILED DESCRIPTION

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that the present disclosure will be thorough and complete, and will fully convey the technical spirit of the disclosure to those skilled in the art.

In the drawings, the exemplary embodiments of the present disclosure are not limited to the illustrated specific forms, but may be exaggerated for the purpose of clarity. Although specific terms have been used in the present specification, they are used in order to describe the present disclose and are not used in order to limit the meaning or the scope of the present disclosure, which is disclosed in the appended claims.

In the specification, "and/or" means that it includes at least one of listed components. It will be understood that when an element is referred to as being "connected" or "coupled" to another element, it can be directly connected or coupled to the other element or intervening elements may be present. The terms of a singular form may include plural forms unless specifically mentioned. It will be further understood that the terms "comprises or includes" and/or "comprising or including" when used in this specification, specify the presence of stated features, integers, steps, operations, elements, and/or components, but do not preclude the presence or addition of one or more other features, integers, steps, operations, elements, components, and/or groups thereof.

Hereinafter, embodiments will be described in detail with reference to the accompanying drawings.

Figure 1:
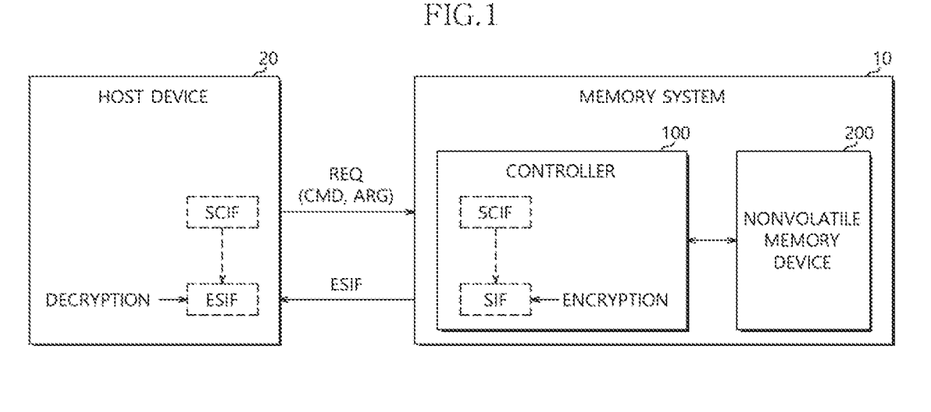
FIG. 1 is a block diagram illustrating a memory system in accordance with an embodiment.

FIG. 1 is a block diagram illustrating a memory system 10 in accordance with an embodiment.

The memory system 10 may be configured to store data provided from an external host device 20, in response to a write request of the host device 20. Furthermore, the memory system 10 may be configured to provide the stored data to the host device 20, in response to a read request of the host device 20.

The memory system 10 may be configured of a Personal Computer Memory Card International Association (PCM-CIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD) and the like.

The memory system 10 may include a controller 100 and a nonvolatile memory device 200.

The controller 100 may control overall operations of the memory system 10. The controller 100 may control the nonvolatile memory device 200 to store data in the nonvolatile memory device 200 and read the data from the nonvolatile memory device 200, in response to a request of the host device 20.

The nonvolatile memory device 200 may store data transmitted from the controller 100 and may read the stored data and transmit the read data to the controller 100, under control of the controller 100.

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

Although FIG. 1 illustrates that the memory system 10 includes one nonvolatile memory device 200, the number of nonvolatile memory devices included in the memory system 10 is not limited thereto.

In an embodiment, the controller 100 may provide system information SIF to the host device 20 in response to a system information request REQ transmitted from the host device 20. The system information SIF may be internal information needed for the controller 100 to manage the memory system 10. The system information SIF may be, for example, at least one of bad block information, erase count information, read count information, and physical read data for the nonvolatile memory device 200. Here, the controller 100 in accordance with an embodiment may determine whether the host device 20 is qualified to obtain the system information SIF, and encrypt the system information SIF and provide the encrypted system information SIF to the host device 20, thus preventing an indiscriminate leak of the sensitive system information SIF.

In detail, first, the host device 20 and the controller 100 may have identical security information SCIF. The security information SCIF may be stored in each of internal memories (not illustrated) of the host device 20 and the controller 100. When the system information SIF of the memory system 10 is needed, the host device 20 may transmit the system information request REQ to the controller 100 based on the security information SCIF stored in the host device 20. The system information request REQ may include a command CMD and an argument ARG. The command CMD may be a signal for requesting the system information SIF from the controller 100. The argument ARG may be additional information needed for the controller 100 to process the system information SIF and transmit the processed system information SIF to the host device 20.

When the system information request REQ is received from the host device 20, the controller 100 may evaluate a qualification of the host device 20 based on the security information SCIF stored in the controller 100 in response to the command CMD, and encrypt the system information SIF. The controller 100 may transmit the encrypted system information ESIF to the host device 20.

Subsequently, the host device 20 may receive the encrypted system information ESIF from the controller 100, and decrypt the encrypted system information ESIF based on the security information SCIF stored in the host device 20, thus obtaining the system information SIF.

In summary, the security information SCIF that is used by the host device 20 and the memory system 10 may be shared only between the host device 20 and the memory system 10 so as to protect the system information SIF. In other words, when providing a vendor with the memory system 10 that stores the security information SCIF, a manufacturer of the memory system 10 may also separately provide the vendor with the security information SCIF. Therefore, the vendor may access, using the security information SCIF, the memory system 10 through the host device 20. The memory system 10 may allow the host device 20 that uses the same security information SCIF as that of the memory system 10, to access the memory system 10.

According to this scheme, since a user of the memory system 10 may not access the system information SIF of the memory system 10, the system information SIF may be kept secure. Furthermore, as will be described with reference to FIG. 2, the manufacturer of the memory system 10 may provide different pieces of security information to different vendors, respectively, so that the system information SIF may be kept secure between the vendors.

Figure 2:
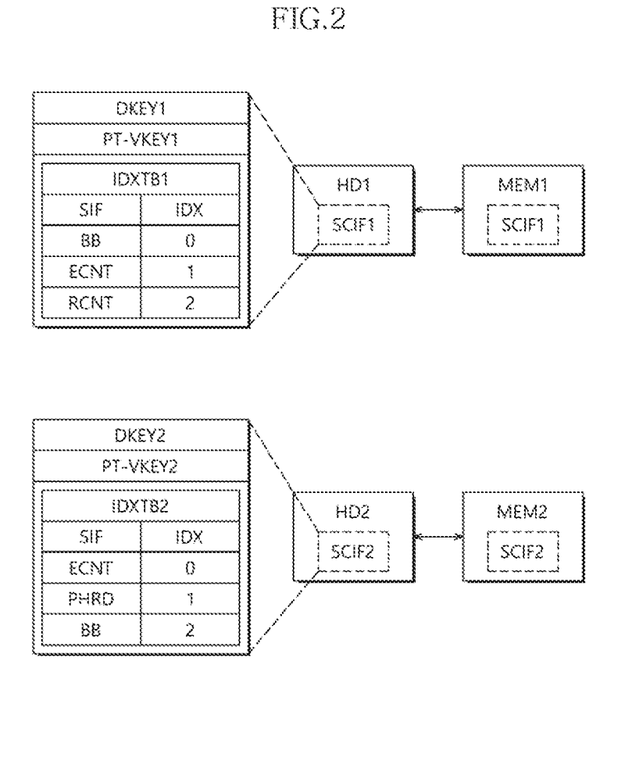
FIG. 2 is a diagram illustrating a method of operating first and second memory systems based on different pieces of security information, in accordance with an embodiment.

FIG. 2 is a diagram illustrating a method of operating first and second memory systems MEM1 and MEM2 based on different pieces of security information SCIF1 and SCIF2, respectively, in accordance with an embodiment.

Referring to FIG. 2, the first and second memory systems MEM1 and MEM2 may be supplied from the manufacturer to respective different vendors. First and second host devices HD1 and HD2 may be devices to be used by the venders to access the first and second memory systems MEM1 and MEM2, respectively.

Here, a vendor that uses the first host device HD1 may be provided with the first security information SCIF1, and may be supplied with the first memory system MEM1 that stores the first security information SCIF1. Another vendor that uses the second host device HD2 may be provided with the second security information SCIF2, and may be supplied with the second memory system MEM2 that stores the second security information SCIF2.

The first security information SCIF1 may include a fixed key DKEY1, a variable key position PT-VKEY1, and an index table IDXTB1. A fixed key DKEY2, a variable key position PT-VKEY2, and an index table IDXTB2 that are included in the second security information SCIF2 may differ from the fixed key DKEY1, the variable key position PT-VKEY1, and the index table IDXTB1, respectively, that are included in the first security information SCIF1.

The index table IDXTB1 of the first security information SCIF1 will be further described. The index table IDXTB1 may include one or more index values IDX corresponding to one or more pieces of system information SIF, respectively. For instance, bad block information BB may correspond to an index value IDX of 0, erase count information ECNT may correspond to an index value IDX of 1, and read count information RCNT may correspond to an index value IDX of 2. As will be described below, the first host device HD1 may use the index values IDX of the index table IDXTB1 to inform the first memory system MEM1 of the system information SIF desired by the host device HD1.

In the index table IDXTB2 of the second host device HD2, erase count information ECNT may correspond to an index value IDX of 0, physical read data PHRD may correspond to an index value IDX of 1, and bad block information BB may correspond to an index value IDX of 2. The second host device HD2 may use the index values IDX of the index table IDXTB2 to inform the second memory system MEM2 of the system information SIF desired by the host device HD2.

In other words, since the first host device HD1 and the second host device HD2 use the different index tables IDXTB1 and IDXTB2, respectively, the security of the system information SIF may be further enhanced. That is, if an exact index table is not known, desired system information SIF may not be obtained.

The above-mentioned system information SIF will be described in detail. The bad block information BB may be information about or related to bad memory blocks included in the nonvolatile memory device 200 of FIG. 1. The erase count information ECNT may be or represent erase counts of one or more certain memory blocks of the nonvolatile memory device 200. The read count information RCNT may be or denote read counts of one or more certain memory blocks of the nonvolatile memory device 200. The physical read data PHRD may be or represent data read by directly accessing a physical address of the nonvolatile memory device 200.

Although FIG. 2 illustrates that the index tables IDXTB1 and IDXTB2 include the same index values IDX from 0 to 2, the index tables IDXTB1 and IDXTB2 may include different index values IDX, depending on embodiments. Furthermore, the number or type of pieces of system information SIF included in each of the index tables IDXTB1 and IDXTB2 is not limited to that illustrated in FIG. 2.

A detailed method of operating the first and second host devices HD1 and HD2 and the first and second memory systems MEM1 and MEM2 based on the first and second security information SCIF1 and SCIF2 will be described below in detail with reference to FIGS. 3A and 3B.

Figure 3A:
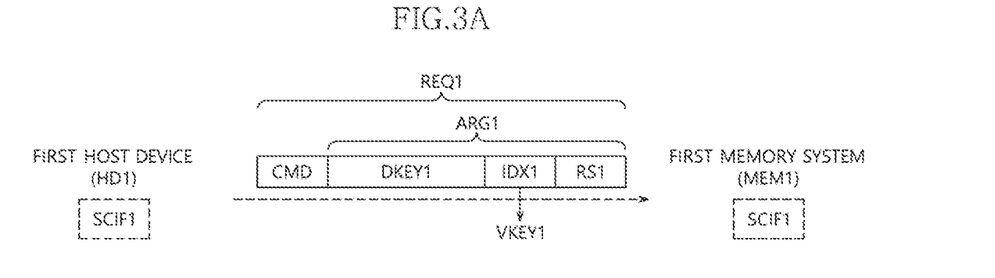
FIG. 3A is a diagram illustrating a first system information request transmitted from a first host device to the first memory system in accordance with an embodiment.

FIG. 3A is a diagram illustrating a first system information request REQ1 transmitted from the first host device HD1 to the first memory system MEM1 in accordance with an embodiment.

Referring to FIG. 3A, the first host device HD1 may transmit the first system information request REQ1 to the first memory system MEM1 based on the first security information SCIF1 stored in the first host device HD1. The first system information request REQ1 may include a command CMD and an argument ARG1. The command CMD may be a signal for requesting system information from the first memory system MEM1. The argument ARG1 may be additional information needed for the first memory system MEM1 to process the system information and transmit the processed system information to the first host device HD1. Here, the argument ARG1 may include a fixed key DKEY1 and an index value IDX1 that are based on the first security information SCIF1 of the first host device HD1.

When the first system information request REQ1 is received, the first memory system MEM1 may determine suitability of the first system information request REQ1 based on a fixed key of its own first security information SCIF1 and the fixed key DKEY1 included in the argument ARG1. In other words, the first memory system MEM1 may determine whether the first host device HD1 or a vendor that uses the first host device HD1 is qualified or have an authority to request the system information.

In detail, the first memory system MEM1 may determine the suitability or authority by comparing a fixed key of its own first security information SCIF1 with the fixed key DKEY1 included in the argument ARG1. When the fixed key of the first memory system MEM1 is identical with the fixed key DKEY1 of the argument ARG1, the first memory system MEM1 may determine that the first system information request REQ1 is suitable or permissible. When the fixed key of the first memory system MEM1 differs from the fixed key DKEY1 of the argument ARG1, the first memory system MEM1 may determine that the first system information request REQ1 is unsuitable or impermissible.

When the first system information request REQ1 is unsuitable or impermissible, the first memory system MEM1 may ignore the first system information request REQ1 or transmit a predetermined response to the first host device HD1.

On the other hand, when the first system information request REQ1 is suitable or permissible, the first memory system MEM1 may select system information corresponding to the index value IDX1 among a plurality of pieces of system information that are managed by the first memory system MEM1. The first memory system MEM1 may select the system information corresponding to the index value IDX1 by searching for the index value IDX1 in the index table of its own first security information SCIF1.

If the system information is selected, the first memory system MEM1 may encrypt the system information based on the argument ARG1. In detail, first, the first memory system MEM1 may extract the fixed key DKEY1 and a variable key VKEY1 from the argument ARG1. The fixed key DKEY1 and the variable key VKEY1 may be values that are placed at predetermined positions in the argument ARG1.

For example, the fixed key DKEY1 may be placed next to the command CMD, as illustrated in the drawing. The fixed key DKEY1 may be unchangeable even when another system information request of the first host device HD1 is received. In other words, the fixed key DKEY1 may have the same value each time the first host device HD1 generates a system information request.

The variable key VKEY1 may be extracted from a position of the variable key VKEY1 included in the first security information SCIF1 of the first memory system MEM1. The variable key VKEY1 may be variable when another system information request of the first host device HD1 is received. In other words, the variable key VKEY1 may have a different value each time the first host device HD1 generates a system information request. The variable key VKEY1 may be extracted, for example, from the index value IDX1, as illustrated in the drawing.

Since the first host device HD1 may also recognize the position of the variable key VKEY1 from its own first security information SCIF1, the first host device HD1 may extract and use the variable key VKEY1 when the encrypted system information is decrypted. As such, the variable key VKEY1 may enhance the security of the system information.

Hence, the first memory system MEM1 may encrypt the system information using the fixed key DKEY1 and the variable key VKEY1 based on a predetermined encryption algorithm. Furthermore, the first host device HD1 may decrypt the encrypted system information using the fixed key DKEY1 and the variable key VKEY1 based on a decryption algorithm corresponding to the encryption algorithm of the firs memory system MEM1.

Here, a remaining part RS1 of the argument ARG1 may include a predetermined address of the nonvolatile memory device 200 that is related to the system information, for example, erase count information and read count information.

Figure 3B:
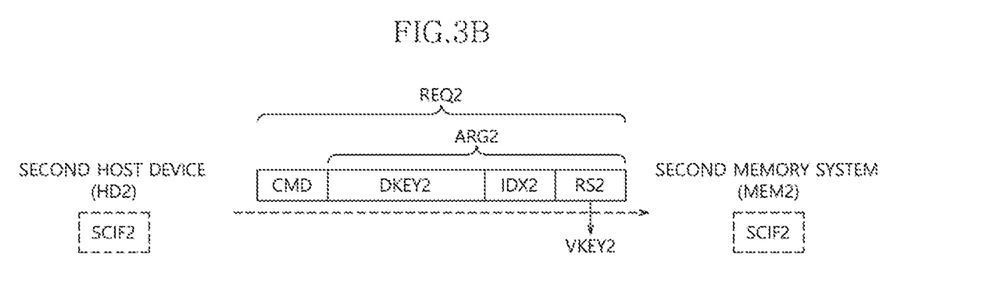
FIG. 3B is a diagram illustrating a second system information request transmitted from a second host device to the second memory system in accordance with an embodiment.

FIG. 3B is a diagram illustrating a second system information request REQ2 transmitted from the second host device HD2 to the second memory system MEM2 in accordance with an embodiment.

Referring to FIG. 3B, the second host device HD2 may transmit the second system information request REQ2 to the second memory system MEM2 based on the second security information SCIF2 stored in the second host device HD2. The second system information request REQ2 may include a command CMD and an argument ARG2 like the first system information request REQ1 of FIG. 3A. The command CMD of the second system information request REQ2 may be the same as the command CMD of the first system information request REQ1. However, the argument ARG2 of the second system information request REQ2 may include a fixed key DKEY2 and an index value IDX2 that are based on the second security information SCIF2.

Furthermore, the second system information request REQ2 may include a variable key VKEY2 at a position different from that of the first system information request REQ1. The variable key VKEY2 may be extracted from the position of the variable key VKEY2 included in the second security information SCIF2 of the second memory system MEM2. The variable key VKEY2 may be extracted, for example, from a remaining part RS2 of the argument ARG2, as illustrated in the drawing.

Since the second host device HD2 may also recognize the position of the variable key VKEY2 from its own second security information SCIF2, the second host device HD2 may extract and use the variable key VKEY2 when the encrypted system information is decrypted.

A method of transmitting, by the second memory system MEM2, the encrypted system information to the second host device HD2 in response to the second system information request REQ2, and decrypting, by the second host device HD2, the encrypted system information is similar to the method of operating the first memory system MEM1 and the first host device HD1 described with reference to FIG. 3A; therefore, detailed description thereof will be omitted.

Figure 4:
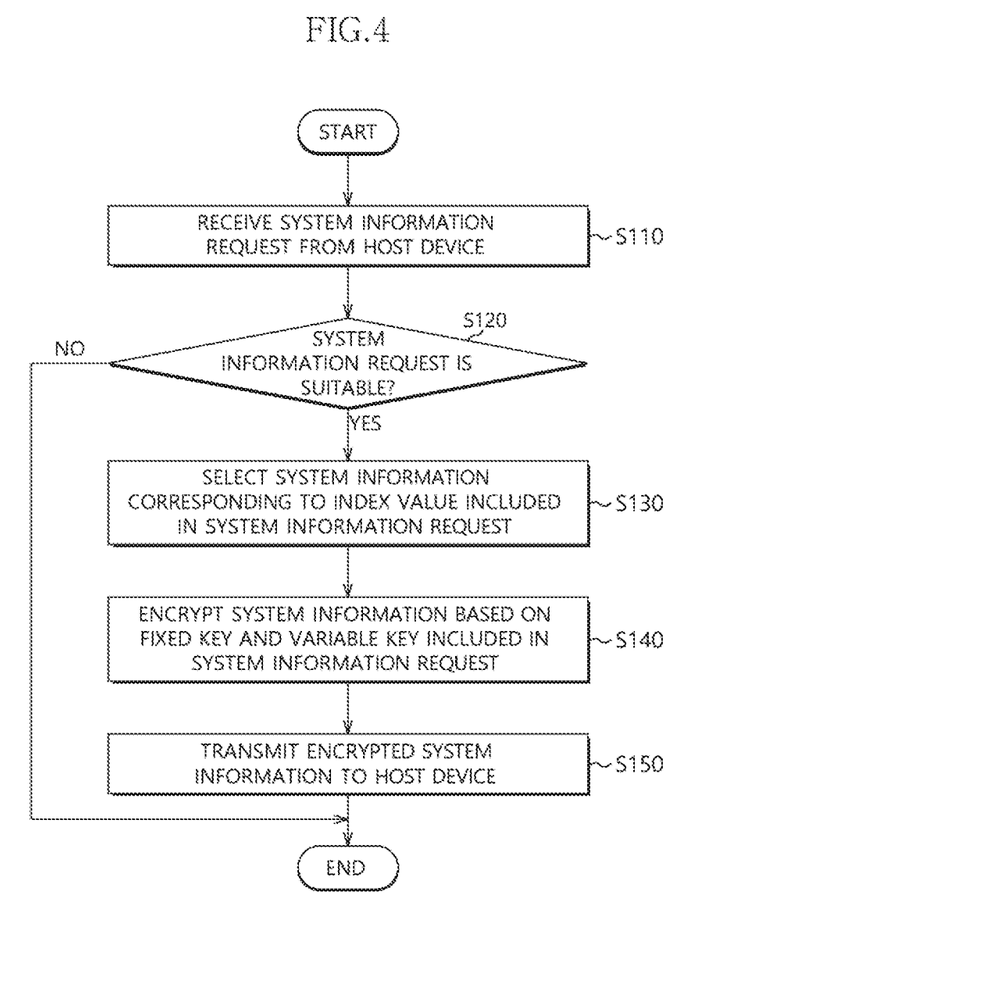
FIG. 4 is a flowchart illustrating a method of operating the memory system of FIG. 1, in accordance with an embodiment.

FIG. 4 is a flowchart illustrating a method of operating the memory system 10 of FIG. 1 in accordance with an embodiment.

Referring to FIG. 4, at step S110, the controller 100 may receive a system information request REQ from the host device 20. The system information request REQ may include a command CMD and an argument ARG.

At step S120, the controller 100 may determine whether the system information request REQ is suitable. In detail, the controller 100 may determine the suitability of the system information request REQ by comparing a fixed key included in its own security information SCIF with a fixed key included in the argument ARG. When the system information request REQ is unsuitable or impermissible, the process may end. In other words, when the system information request REQ is unsuitable or impermissible, the controller 100 may ignore the system information request REQ. On the other hand, when the system information request REQ is suitable or permissible, the process may proceed to step S130.

At step S130, the controller 100 may select system information SIF corresponding to an index value included in the argument ARG among a plurality of pieces of system information that are managed by the controller 100. The controller 100 may select the system information corresponding to the index value by searching for the index value included in the argument ARG in the index table of its own security information SCIF.

At step S140, the controller 100 may encrypt the system information SIF based on a fixed key and a variable key that are included in the system information request REQ. The fixed key and the variable key may be values that are placed at predetermined positions in the argument ARG.

At step S150, the controller 100 may transmit the encrypted system information ESIF to the host device 20. The host device 20 may decrypt the encrypted system information using the fixed key and the variable key that have been used by the controller 100 to encrypt the system information SIF.

Figure 5:
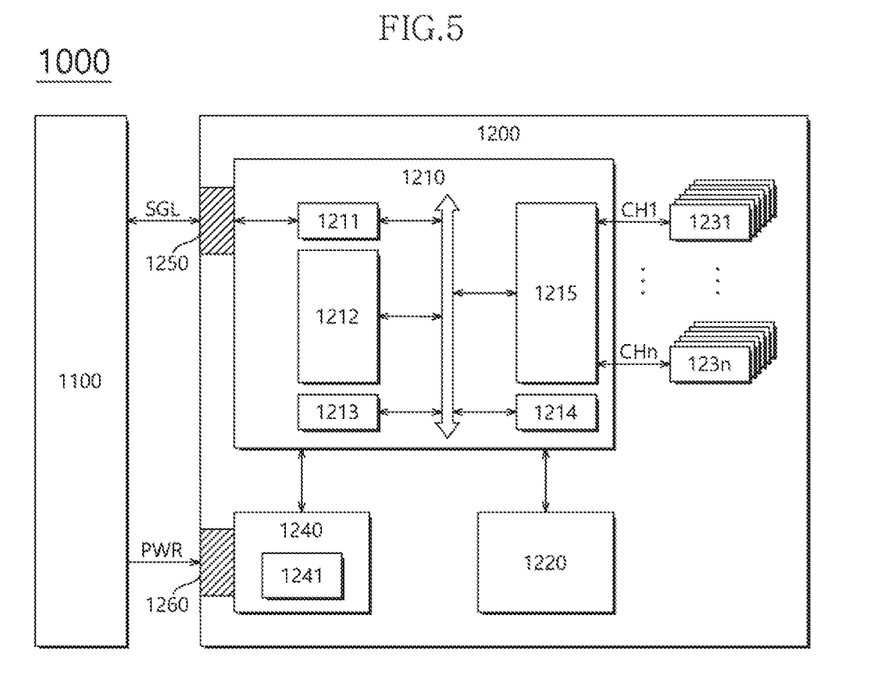
FIG. 5 is a diagram illustrating a data processing system including a solid state drive (SSD) in accordance with an embodiment.

FIG. 5 is a diagram illustrating a data processing system 1000 including a solid state drive (SSD) 1200 in accordance with an embodiment. Referring to FIG. 5, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may operate in the same manner as the controller 100 shown in FIG. 1. The controller 1210 may include security information provided to a vendor. The controller 1210 may transfer system information encrypted based on own security information to the host device 1100 in response to system information request of host device 1100.

The controller 1210 may include a host interface circuit 1211, a control circuit 1212, a random access memory 1213, an error correction code (ECC) circuit 1214, and a memory interface circuit 1215.

The host interface circuit 1211 may exchange a signal SGL with the host device 1100 through the signal connector 1250. The signal SGL may include a command, an address, data, and so forth. The host interface circuit 1211 may interface the host device 1100 and the SSD 1200 according to the protocol of the host device 1100. For example, the host interface circuit 1211 may communicate with the host device 1100 through any one of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-e or PCIe) and universal flash storage (UFS).

The control circuit 1212 may analyze and process the signal SGL received from the host device 1100. The control circuit 1212 may control operations of internal function blocks according to a firmware or a software for driving the SSD 1200. The random access memory 1213 may be used as a working memory for driving such a firmware or software.

The ECC circuit 1214 may generate the parity data of data to be transmitted to at least one of the nonvolatile memory devices 1231 to 123n. The generated parity data may be stored together with the data in the nonvolatile memory devices 1231 to 123n. The ECC circuit 1214 may detect an error of the data read from at least one of the nonvolatile memory devices 1231 to 123n, based on the parity data. If a detected error is within a correctable range, the ECC circuit 1214 may correct the detected error.

The memory interface circuit 1215 may provide control signals such as commands and addresses to at least one of the nonvolatile memory devices 1231 to 123n, according to control of the control circuit 1212. Moreover, the memory interface circuit 1215 may exchange data with at least one of the nonvolatile memory devices 1231 to 123n, according to control of the control circuit 1212. For example, the memory interface circuit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 6:
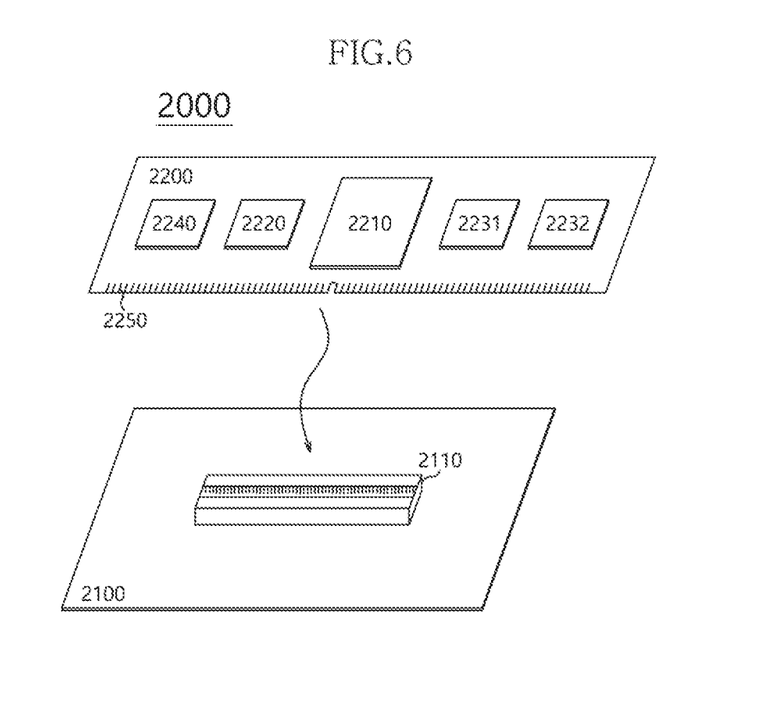
FIG. 6 is a diagram illustrating a data processing system including a memory system in accordance with an embodiment.

FIG. 6 is a diagram illustrating a data processing system 2000 including a memory system 2200 in accordance with an embodiment. Referring to FIG. 6, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 5.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any one side of the memory system 2200.

Figure 7:
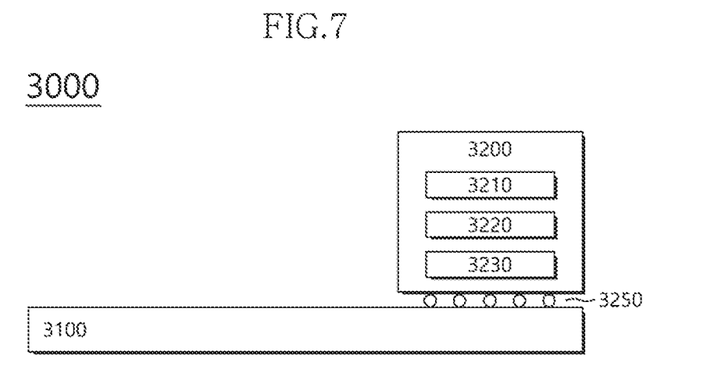
FIG. 7 is a diagram illustrating a data processing system including a memory system in accordance with an embodiment.

FIG. 7 is a diagram illustrating a data processing system 3000 including a memory system 3200 in accordance with an embodiment. Referring to FIG. 7, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 5.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 8:
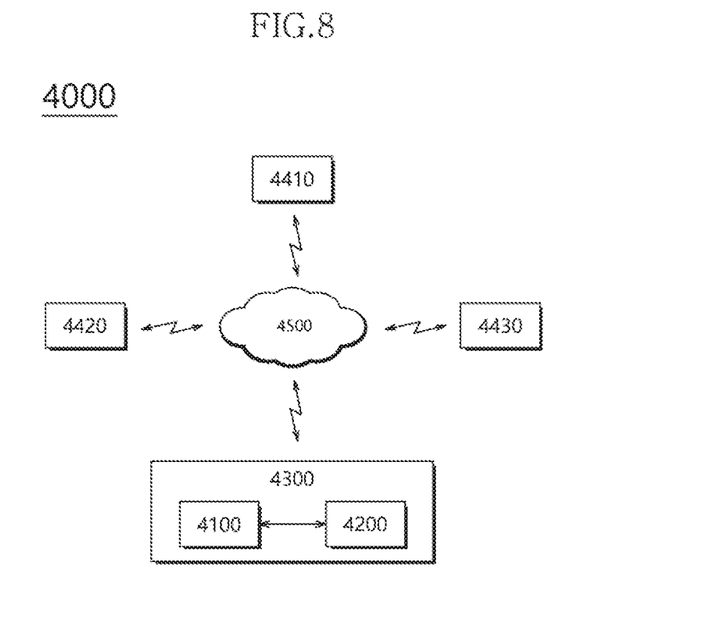
FIG. 8 is a diagram illustrating a network system including a memory system in accordance with an embodiment.

FIG. 8 is a diagram illustrating a network system 4000 including a memory system 4200 in accordance with an embodiment. Referring to FIG. 8, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the memory system 1200 shown in FIG. 5, the memory system 2200 shown in FIG. 6 or the memory system 3200 shown in FIG. 7.

Figure 9:
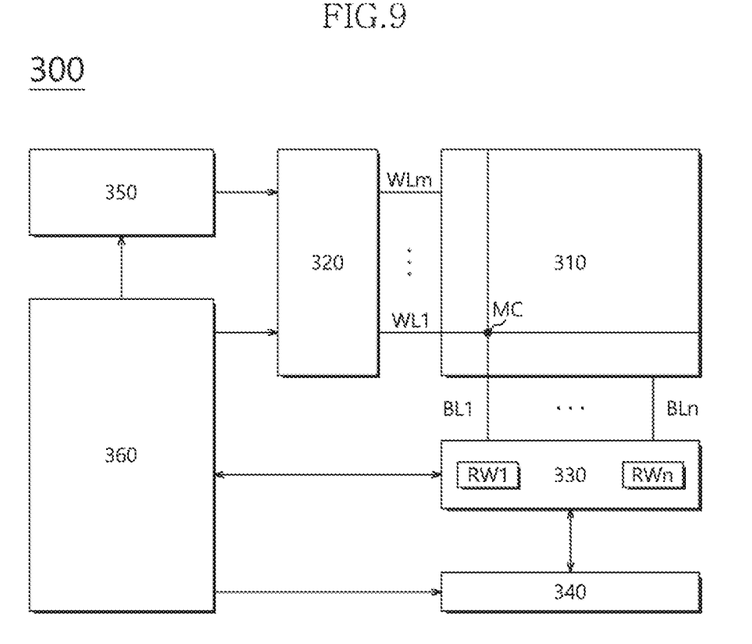
FIG. 9 is a block diagram illustrating a nonvolatile memory device included in a memory system in accordance with an embodiment.

FIG. 9 is a block diagram illustrating a nonvolatile memory device 300 included in a memory system in accordance with an embodiment. Referring to FIG. 9, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

As described above, a memory system in accordance with an embodiment may prevent an indiscriminate leak of sensitive system information.

While various embodiments have been described above, it will be understood to those skilled in the art that the embodiments described are by way of example only. Accordingly, the memory system described herein should not be limited based on the described embodiments. Rather, the memory system having the same described herein should only be limited in light of the claims that follow when taken in conjunction with the above description and accompanying drawings.

What is claimed is:

1. A memory system comprising:
a nonvolatile memory device; and
a controller configured to control the nonvolatile memory device,
wherein the controller is configured to:
receive a system information request including a command and an argument from a host device;
determine suitability of the system information request based on a fixed key included in the argument in response to the command;
encrypt system information based the argument when the system information request is suitable; and
transmit the encrypted system information to the host device,
wherein the controller is configured to select the system information corresponding to an index value included in the argument among one or more pieces of system information that are managed by the controller.

2. The memory system according to claim 1, wherein the controller is configured to determine the suitability by comparing a fixed key stored in the controller with the fixed key included in the argument.

3. The memory system according to claim 1,
wherein the controller is configured to select the system information by searching for the index value in an index table stored in the controller, and
wherein the index table includes the one or more pieces of system information that correspond to one or more index values, respectively.

4. The memory system according to claim 1, wherein the controller is configured to extract a value placed at a predetermined position in the argument as a variable key, and encrypt the system information based on the fixed key and the variable key.

5. The memory system according to claim 4, wherein the fixed key is unchangeable in another system information request received from the host device, and the variable key is variable in the another system information request.

6. The memory system according to claim 1, wherein the system information includes at least one of bad block information, erase count information, read count information, and physical read data for the nonvolatile memory device.

7. A memory system comprising:
a nonvolatile memory device; and
a controller configured to control the nonvolatile memory device,
wherein the controller is configured to:
receive a system information request including a command and an argument from a host device;
encrypt system information based on a fixed key and a variable key that are included in the argument, in response to the command; and
transmit the encrypted system information to the host device,
wherein the fixed key is unchangeable in another system information request received from the host device, and the variable key is variable in the another system information request.

8. The memory system according to claim 7, wherein the controller is configured to determine suitability of the system information request based on the fixed key, and encrypts the system information when the system information request is suitable.

9. The memory system according to claim 8, wherein the controller is configured to determine the suitability by comparing a fixed key stored in the controller with the fixed key included in the argument.

10. The memory system according to claim 7, wherein the controller is configured to select the system information corresponding to an index value included in the argument among one or more pieces of system information that are managed by the controller.

11. The memory system according to claim 10,
wherein the controller is configured to select the system information by searching for the index value in an index table stored in the controller, and
wherein the index table includes the one or more pieces of system information that correspond to one or more index values, respectively.

12. The memory system according to claim 7, wherein the system information includes at least one of bad block information, erase count information, read count information, and physical read data for the nonvolatile memory device included in the memory system.

13. A memory system comprising:
a nonvolatile memory device; and
a controller configured to:
receive a system information request including a command and an argument from a host device;
encrypt system information by comparing the argument with security information stored in the memory system in response to the command; and
transmit the encrypted system information to the host device,
wherein the controller is configured to select the system information corresponding to an index value included in the argument among one or more pieces of system information that are managed by the memory system.

14. The memory system according to claim 13, wherein the controller is configured to determine suitability of the system information request based on a fixed key included in the argument, and encrypt the system information when the system information request is suitable.

15. The memory system according to claim 13, wherein the controller is configured to determine the suitability by comparing a fixed key included in the security information with the fixed key included in the argument.

16. The memory system according to claim 13,
wherein the controller is configured to select the system information by searching for the index value in an index table included in the security information, and
wherein the index table includes the one or more pieces of system information that correspond to one or more index values, respectively.

17. The memory system according to claim 13, wherein the controller is configured to extract, with reference to a position of a variable key included in the security information, a value corresponding to the position from the argument as the variable key, and encrypt the system information based on a fixed key included in the argument and the variable key.

18. The memory system according to claim 17, wherein the fixed key is unchangeable in another system information request received from the host device, and the variable key is variable in the another system information request.

19. The memory system according to claim 13, wherein the system information includes at least one of bad block information, erase count information, read count information, and physical read data for the nonvolatile memory device included in the memory system.

\* \* \* \* \*